Patented May 22, 1934

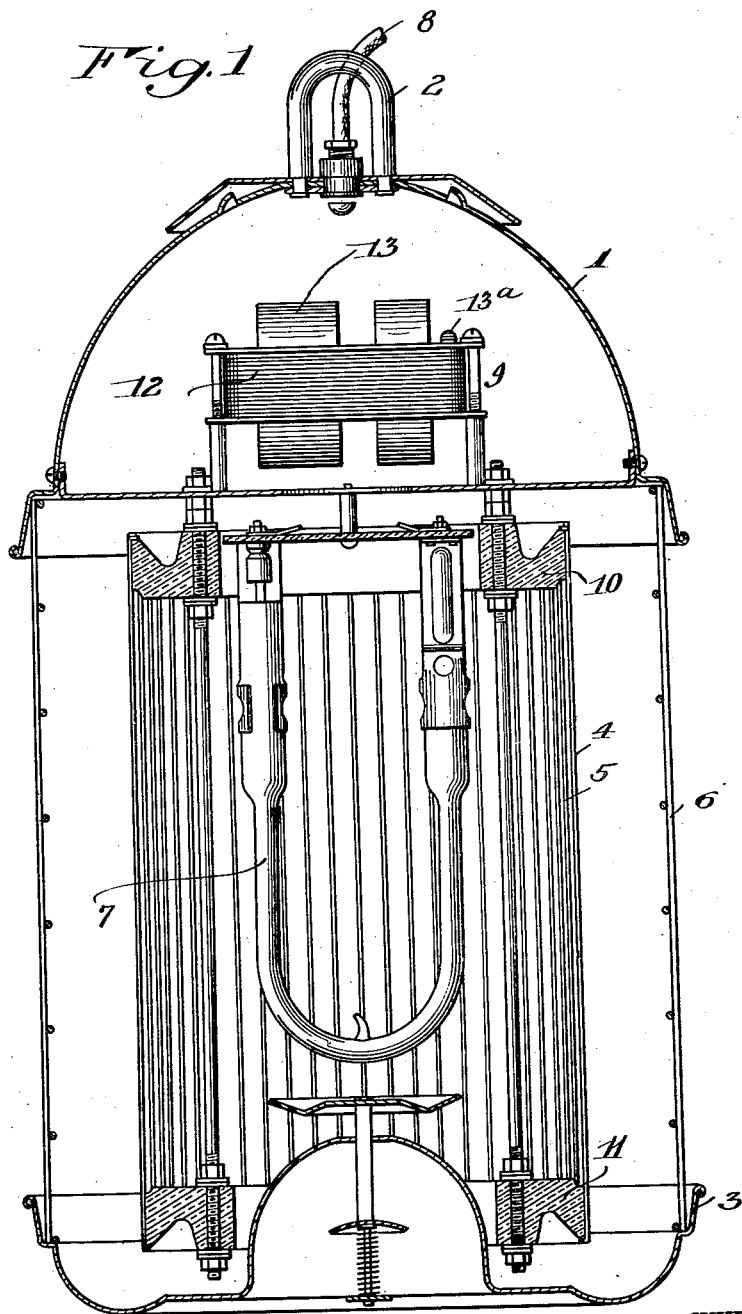

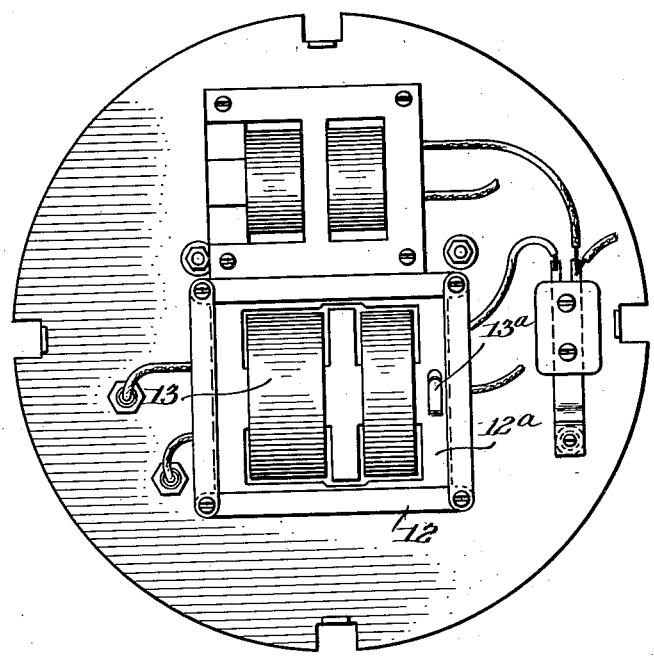
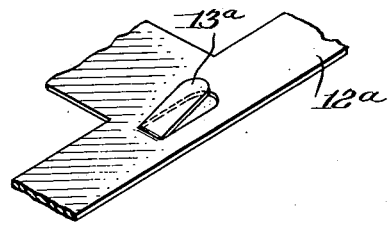
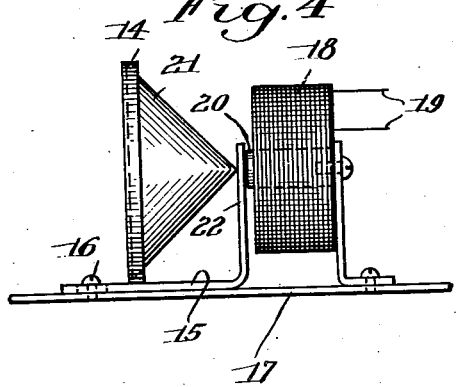

1,960,084

UNITED STATES PATENT OFFICE

1,960,084

ELECTRICAL INSECT EXTERMINATOR

William F. Folmer and Harrison L. Chapin, Rochester, N. Y., assignors to Folmer-Chapin Corporation, Rochester, N. Y., a corporation of New York Original application May 25, 1932, Serial No. 613,434. Divided and this application May 9, 1933, Serial No. 670,141

1 Claim. (Cl. 43—112)

Our present invention relates to electrical appliances and more particularly to devices for killing flying insects through the use of high tension currents passing through conductors so arranged that when the insect, attracted by a suitable lure, comes in contact therewith, its body closes the circuit and the insect is thereby electrocuted. Such an appliance is shown in our copending application, Serial No. 613,434, filed May 25, 1932, of which this is a division. The invention has for its general object to improve the luring devices referred to, and the improvements are directed in part toward providing an audible lure attractive to certain insects; and toward incorporating the lure as a part of the necessary electrical connections of the apparatus.

To these and other ends, the invention resides in certain improvements and combinations of parts, all as will be hereinafter more fully described, the novel features being pointed out in the claim at the end of this specification.

In the drawings:

Fig. 1 is a central vertical section of an insect exterminator constructed in accordance with and illustrating one embodiment of our invention;

Fig. 2 is a top plan view of the transformer and its mounting;

Fig. 3 is an enlarged perspective view, partly broken away, of one of the laminations of the transformer; and Fig. 4 is a side elevation of a modified form of audible lure.

Similar reference numerals throughout the several views indicate the same parts.

In our prior patent, No. 1,848,614, dated March 8, 1932, we have disclosed an insect killer of the general nature involved in the plan of the invention herein disclosed. Fig. 1, in part and in a general way, illustrates the device constituting the subject matter of that application. It must be briefly described per se in this case in order to give an understanding of the object and accomplishments of the present invention.

Referring more particularly to the drawings, and first describing the mechanical features of the device, 1 indicates a metallic dome crowned by an eye 2 by which it may be suspended. Suspended from this dome in turn is a metallic base 3 consisting of a pan designed to catch the bodies of the insects that are electrocuted in the manner hereinafter described, all as set forth in the patent above referred to. Between the dome 1 and the pan 3 extend a plurality of wires 4 and 5 alternating in polarity and suitably spaced. These are, of course, insulated from their surrounding metallic structure which embodies a guard 6, which prevents contact with the wires 4—5 by humans, birds or other than the flying insects which it is the purpose of the device to destroy. Within the cage 4—5 that these wires constitute is shown a luminous lure for the insects, consisting of a mercury lamp 7, which, however, is not important herein as this application is a division of our pending application, Serial No. 613,434, filed May 25, 1932. That parent case is concerned with that particular lure, while another means of attracting the insects constitutes the subject matter of the present case. It may be said, however, that the lighting circuit or line wires for this lamp are indicated generally at 8 in Fig. 1 and also run to the transformer, indicated generally at 9, that steps up the line voltage, ordinarily 110 volts, to the 3,000 or 4,000 volts required for the high tension killing wires 4—5. The insulating media for these wires referred to are shown to consist of upper and lower porcelain rings 10 and 11 over which the wires are laced.

We have discovered that some insects, such as mosquitoes, are attracted by the sounds emitted by their mates while in flight and also that these sounds can be artificially mechanically produced to constitute an audible lure to take advantage of this phenomenon. We have further discovered that the necessary mechanism can be incorporated in the transformer 9 itself closely adjacent to the high tension cage.

When one of the strata or plates of the laminated field 12 supplying the coil 13 of the transformer circuit is loosened and the transformer is supplied with current, this plate is set in vibration and produces a buzzing or singing noise suitable for the purpose. In Figs. 2 and 3, we have shown another simple way of producing this noise, which consists of punching from one of the laminated plates 12ª a tongue 13ª that vibrates in the manner of the tongue of a reed instrument, except that its rapid vibrations constitute an amplification of the vibrations produced in the transformer.

In lieu of this utilization of the transformer itself, an additional sound-producing element, such as that shown in Fig. 4, may be utilized and placed adjacent to the high tension cage or therein. This consists of a brass ring 14 supported on a soft steel element 15 adjustable by screws 16 on a base 17. Also supported on the base is a coil 18 supplied with a 110 volt line current from wires 19. Within the coil is a soft iron core 20. The ring 14 supports a paper cone or amplifier 21 in delicately adjusted contact with the upturned end 22 of the steel 15, which is interposed between it and the end of the core 20. With a cycle in the line 19 of 25 to 60, rapid variations in the magnetic influence of the core upon the steel piece 22 will vibrate the cone or amplifier, when properly adjusted, with a frequency producing the desired result.

We claim as our invention:

In an electrical insect exterminator, the combination with positive and negative electrodes arranged to be shorted by the presence of insect bodies between them, of a source of electrical energy, and a transformer connected therewith and to the electrodes to charge the latter with high tension current, the transformer embodying laminations, one of which is fitted with a vibrant tongue adapting the transformer, when operating, to produce audible vibrations simulating sounds produced by the insects and to act as a lure for the latter.

WILLIAM F. FOLMER.
HARRISON L. CHAPIN.